(12) United States Patent
Sumimoto et al.

(10) Patent No.: US 7,477,493 B2
(45) Date of Patent: Jan. 13, 2009

(54) ALTERNATOR CONTROL DEVICE FOR VEHICLE

(75) Inventors: Katsuyuki Sumimoto, Chiyoda-ku (JP); Junya Sasaki, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 22 days.

(21) Appl. No.: 11/740,975

(22) Filed: Apr. 27, 2007

(65) Prior Publication Data

US 2008/0106829 A1 May 8, 2008

(30) Foreign Application Priority Data

Nov. 7, 2006  (JP) ............................. 2006-301470

(51) Int. Cl.
*H02H 7/06* (2006.01)

(52) U.S. Cl. .......................................... 361/23; 361/21

(58) Field of Classification Search .................... 361/20, 361/21, 23; 322/15, 28
See application file for complete search history.

(56) References Cited

FOREIGN PATENT DOCUMENTS

| JP | 08-047180 A | 2/1996 |
|----|-------------|--------|
| JP | 10-51976 A | 2/1998 |
| JP | 2004-194395 A | 7/2004 |

*Primary Examiner*—Danny Nguyen
(74) *Attorney, Agent, or Firm*—Sughrue Mion, PLLC (57) ABSTRACT

A vehicle alternator control device in which, when a signal detection portion detects a determined input signal, an operating mode of an overvoltage warning portion is switched to a detection operating mode by an overvoltage warning operating mode switching portion. In the detection operating mode, the overvoltage warning portion is activated when a voltage below a determined voltage has continued for a time that is less than a determined time. Accordingly, checks related to the operation of the overvoltage warning portion can be completed in a short time at a plant or the like.

6 Claims, 3 Drawing Sheets

ALTERNATOR CONTROL DEVICE FOR VEHICLE

BACKGROUND OF THE INVENTION

1. Field of the Invention

The invention relates to a control device for an alternator mounted in a vehicle like an automobile, and in particular to an alternator control device that allows necessary checks and tests to be easily performed in a plant or the like.

2. Description of the Related Art

An alternator mounted in a vehicle is often commercially manufactured as an alternator assembly that incorporates a rectifier that rectifies alternating current output of the alternator, and an alternator control device. In some cases, the alternator control device incorporated in the alternator assembly includes many terminals such as: a power supply terminal B connected to an output terminal of the rectifier that rectifies phase voltage of the alternator; an earth terminal E that has the same electric potential as the body of the vehicle; and a field terminal f connected to a field coil of the alternator. Other terminals include: a phase voltage input terminal p to which the phase voltage of the alternator is input; an ignition terminal IG that is connected to a contact that is opened and closed by an ignition switch; a communication terminal FR that transmits information about the power generation state of the alternator to an external device like an engine control unit (hereinafter referred to as "ECU"); and a communication terminal C that receives a power generation control signal from the external device like the ECU.

Furthermore, alternator control devices have been proposed in the known art in which a single signal line carries two-way communication of, for example, an IG signal that is a power turn-on signal, an FR signal that is a power generation state signal, and a C signal that is a power generation control signal. Such alternator control devices aim to reduce the number of terminals and wires used (for example, refer to Patent Document JP-A-10-51976).

Normally, an alternator control device is provided with an overvoltage warning portion. If the generated voltage of the alternator becomes an overvoltage, and this overvoltage continues for a predetermined period or longer, the overvoltage warning portion generates an overvoltage warning. In addition, the alternator control device is provided with a load response function that, in the case that the power generation amount of the alternator is increased, increases the power generation amount gradually rather than increasing it suddenly. Adoption of this structure promotes improvement of the engine startability and improvement of the stability of engine idle control.

When the known alternator control devices are used to check the alternator's full power generation at the plant or the like, or when a check is conducted with an excitation switch connected to a field coil turned fully on such that the control device places the alternator in a state in which full power can be obtained, it takes a period of time for the load response function included in the alternator control device to complete load response control. As a result, it is necessary to wait a few tens of seconds until full power is attained after the excitation switch is fully turned on. Accordingly, it takes a period of time to complete the check.

SUMMARY OF THE INVENTION

The invention aims to solve the above-described problems of the known alternator control devices for vehicles, and it is an object thereof to provide an alternator control device that allows necessary checks or tests (hereinafter these terms are referred to collectively using the general term "check") to be easily performed at a plant or the like.

A control device for a vehicle alternator according to the invention including: a first external terminal that receives a rectified output of the vehicle alternator or supply of output from a battery charged by the rectified output; a second external terminal connected to a field coil of the vehicle alternator; a third external terminal to which a phase voltage of the vehicle alternator is input; at least one forth external terminal that is connectable to an external device; and an excitation control portion that controls an exciting current that flows in the field coil. The control device for the vehicle alternator performs control using a load response function that controls the excitation control portion to control the specified signal detection portion that detects when a specified signal is applied to at least one of the first to the fourth external terminals; and a load response coefficient switching portion that switches a value of a load response coefficient of the load response function when the specified signal detection portion detects the specified signal.

The control device for a vehicle alternator according to the invention is provided with the specified signal detection portion that detects when the specified signal is applied to at least one of the first to the fourth external terminals; and the load response coefficient switching portion that switches the value of the load response coefficient of the load response function when the specified signal detection portion detects the specified signal. Accordingly, checks related to the operation of the overvoltage warning portion can be completed at the plant or the like in a short period of time, and the checks can be performed efficiently without providing any type of special terminal. Further, the checks can be completed simply without having any detrimental impact on testing equipment like a battery.

The foregoing and other object, features, and advantages of the present invention will become more apparent from the following detailed description of the present invention when taken in conjunction with the accompanying drawings.

DETAILED DESCRIPTION OF THE PREFERRED EMBODIMENTS

First Embodiment

Figure 1:
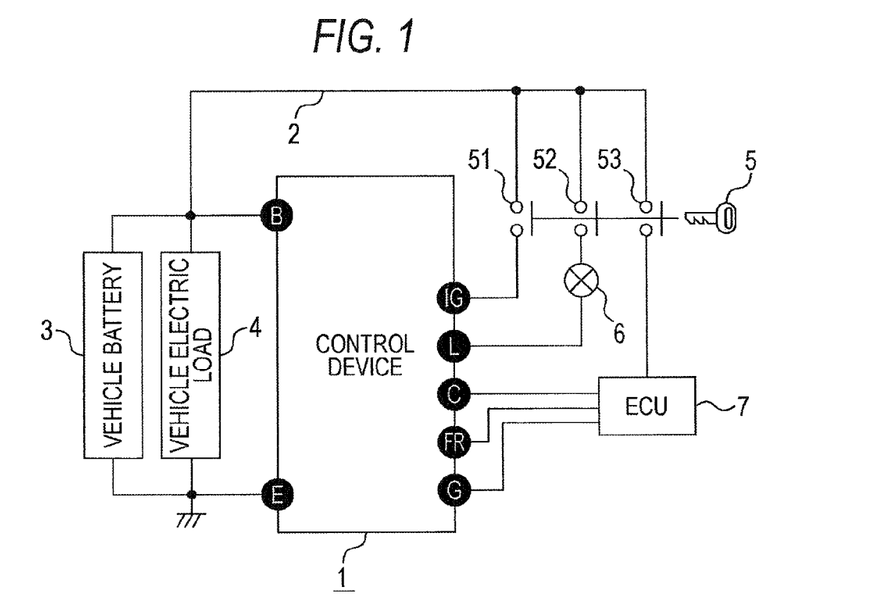
FIG. 1 is a structural diagram showing the system structure of an electrical system of a vehicle like an automobile or the like including a vehicle alternator assembly.
Figure 2:
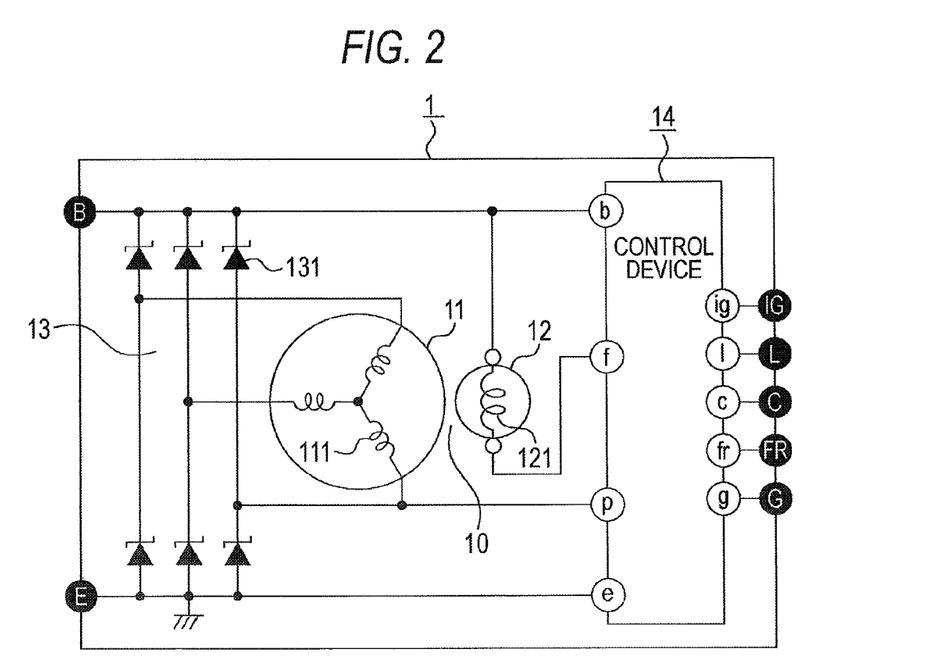
FIG. 2 is a structural diagram showing the internal structure of a vehicle alternator assembly 1.

FIG. 1 is a structure chart showing the system structure of an electrical system of a vehicle like an automobile or the like including an alternator assembly. FIG. 2 is a structure chart showing the internal structure of an alternator assembly 1. In FIG. 1 and FIG. 2, the alternator assembly 1 includes an alternator 10 including a stator 11 and a rotor 12, a rectifier 13 that rectifies alternating current output of the alternator 10, and a control device 14 that controls the alternator 10, and is provided with a power supply terminal B, an earth terminal E, an ignition terminal IG, a charge lamp terminal L that is connected to a charge lamp, a communication terminal C that is connected to an ECU 7 that is an external device, a communication terminal FR, and a communication terminal G. The rectifier 13 includes a plurality of rectifying devices 131 that are bridge connected.

The power supply terminal B is connected a vehicle battery 3, a vehicle electric load 4, and a vehicle power supply 2. The vehicle battery 3 is charged by electric power output of the alternator assembly 1, and the vehicle electric load 4 is driven by supply of electric power that is output from the alternator assembly 1.

The earth terminal E is normally structured by the metal body of the alternator 10 itself, and has the same potential as the body earth of the vehicle because the alternator 10 is assembled to the engine (not shown) of the vehicle. The ignition terminal IG is provided as a monitor terminal for the control device 14 provided in the alternator assembly 1 to detect when an ignition key 5 of the vehicle is on. When the ignition key 5 is turned on, the voltage of the vehicle battery 3 is supplied to the ignition terminal IG via a contact 51. The control device 14 detects that the ignition key 5 has been turned on by detecting the voltage supplied to the ignition terminal IG, and the internal power supply of the control device 14 is activated.

The charge lamp terminal L is connected to the vehicle battery 3 via a charge lamp 6 provided in the vehicle and the contact 52 that is opened/closed by the ignition key 5. The charge lamp 6 lights when the control device 14 detects a system abnormality. The communication terminals C, FR, G are respectively connected to the ECU 7. These communication terminals C, FR, G are used to send/receive control signals between the control device 14 and the ECU 7.

The alternator 10 is provided with the stator 11 that includes a stator coil 111, and the rotor 12 that includes a field coil 121. The rotor 12 is magnetized by energization of the field coil 121, and rotates in the internal space of the stator 11 in association with the rotation of the engine, thereby generating alternating current power in the stator coil 111. The alternating current power generated in the stator coil 111 is converted to direct current power by the rectifier 13, and supplied to the vehicle battery 3 and the vehicle electric load 4 shown in FIG. 1.

The control device 14 controls the magnetization intensity of the rotor 12 by controlling the current flowing in the field coil 121 using Pulse Width Modulation (PWM) control, and thereby controls the output voltage of the alternator 10 to a voltage value that is appropriate for a vehicle power supply. The PWM control is performed by controlling the time interval between grounding and opening of a field terminal f connected to the field coil 121. A power supply terminal b, an earth terminal e, an ignition terminal ig, a charge lamp terminal l, a communication terminal c, a communication terminal fr, and a communication terminal g of the control device 14 are connected respectively to the corresponding power supply terminal B, the earth terminal E, the ignition switch terminal IG, the charge lamp terminal L, the communication terminal C, the communication terminal FR, and the communication terminal G. The respective corresponding terminals have the same potential. A phase voltage input terminal p of the control device 14 is connected to the stator coil 111, and the phase voltage of the stator 11 before rectification is input to the phase voltage input terminal p. The control device 14 uses the frequency of the phase voltage of the stator 11 before rectification input via the phase voltage input terminal p to measure the rotation speed of the rotor 12 of the alternator 10.

Figure 3:
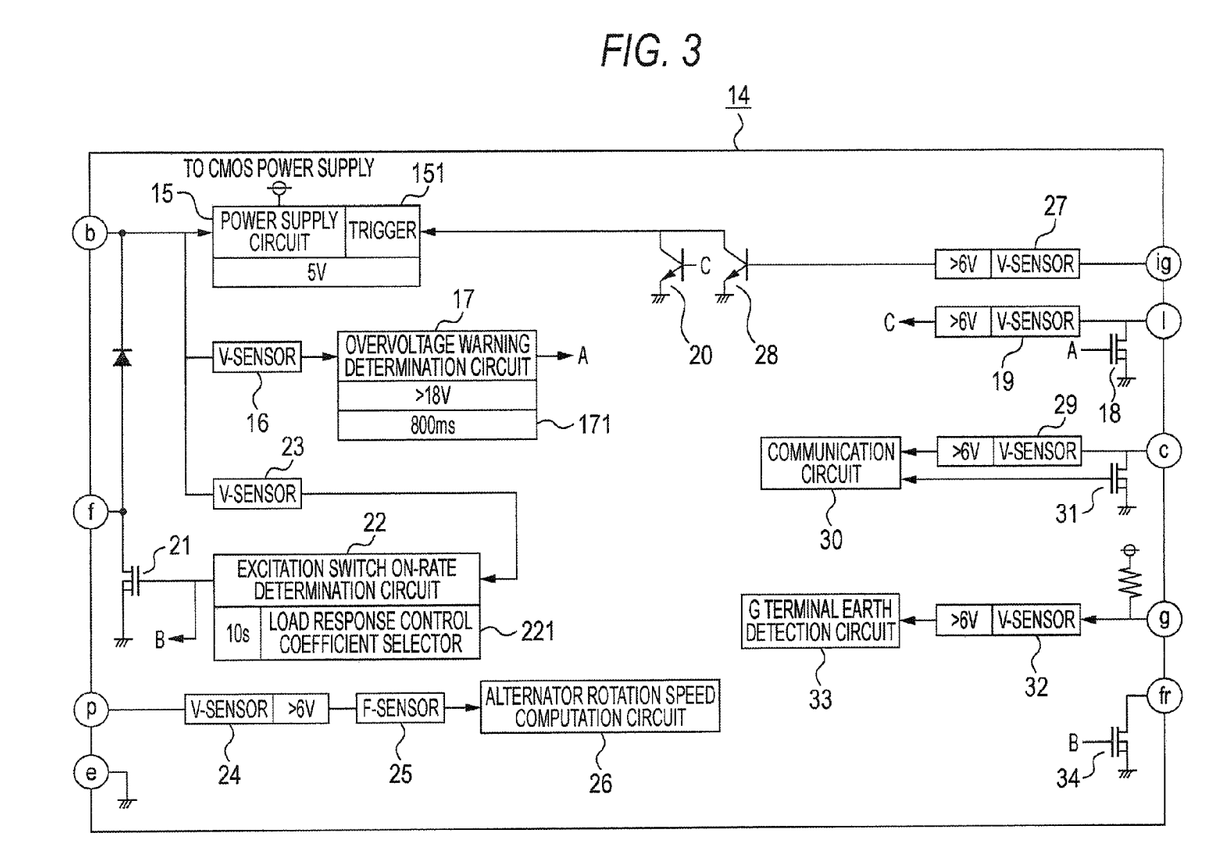
FIG. 3 is a structural diagram showing a control device 14 of a vehicle alternator that is a key feature of the invention.

FIG. 3 is a structure chart showing the control device 14 of the alternator that is key feature of the invention. In FIG. 3, the power supply terminal b is connected to the power supply terminal B of the alternator assembly 1. A power supply circuit 15, which functions as the internal power supply of the control device 14, generates an output voltage of 5 [V] based on the rectified output power of the alternator 10 supplied from the power supply terminal b, and functions as a power supply for operating each of the circuits in the control device 14. When either one of a switching element 20 or a switching element 28, described hereinafter, is connected, a trigger 151 of the power supply circuit 15 is operated to activate the power supply circuit 15.

A voltage sensor 16 detects the generated voltage of the alternator 10 supplied to the power supply terminal b, and inputs the detection voltage to an overvoltage warning determination circuit 17 that functions as an overvoltage warning portion. The overvoltage warning determination circuit 17 includes a determination timer 171, and has an operation mode that, if the value of the detection voltage input from the voltage sensor 16 becomes equal to or more than 18 [V], and this voltage value of 18 [V] continues for a time of 800 [ms] that is set by the determination timer 171, determines that there is an overvoltage and generates an overvoltage warning output A. The reason for outputting the overvoltage warning output A when the detection voltage of equal to or more than 18 [V] continues for 800 [ms] or more is to avoid the occurrence of mistaken warnings caused by instantaneous overvoltage.

An excitation switch 21 formed by an electric field effect transistor (hereinafter referred to as "FET") is connected to the field terminal f that is connected to an end of the field coil 121 of the alternator 10. When the excitation switch 21 is connected, an exciting current flows in the field coil 121. An excitation switch on-rate determination circuit 22 controls the conduction rate of the excitation switch 21, namely, the oh-rate, based on a detection voltage of a voltage sensor 23 that detects the output voltage of the alternator 10 that is supplied to the power supply terminal b.

Control of the on-rate of the excitation switch 21 is controlled based on a load response function. The load response function is a function that, in the case that the power generation amount of the alternator 10 is increased, increases the power generation amount gradually rather than increasing it suddenly. This function assists with improvement of engine startability, and improvement of the stability of engine idle control. In order to achieve the load response function, the excitation switch 21 does not conduct immediately when required to conduct, but is controlled to gradually conduct based on a load response coefficient 221 set by the excitation switch on-rate determination circuit 23. As a result, the generation rate of the alternator 10 also increases gradually. The generation rate of the alternator 10 is proportional to the drive torque of the alternator 10, and thus the drive torque of the alternator 10 also increases. Accordingly, the effect of improving engine idling stability is achieved.

The phase voltage input terminal p is a terminal that detects the rotation speed of the rotor 12 of the alternator 10. The phase voltage of the stator 11 of the alternator 10 before rectification is input to the phase voltage input terminal p. A voltage sensor 24 connected to the phase voltage input terminal p detects the phase voltage before rectification of the stator 11. When the detection value of the voltage sensor 24 exceeds a threshold value set at 6 [V], the detected phase voltage is input to a frequency sensor 25. The frequency sensor 25 measures the frequency based on the input phase voltage, and inputs the measurement value of the frequency to an alternator rotation speed computation circuit 26. The alternator rotation speed computation circuit 26 computes the rotation speed of the rotor 12 of the alternator 10 based on the input frequency.

The ignition terminal ig is a terminal for detecting whether the ignition key 5 is on, and is connected to the terminal IG of the alternator assembly 1 that is connected to the contact 51 that is opened/closed by the ignition key 5. A voltage sensor 27 connected to the ignition terminal ig detects the voltage input to the ignition terminal ig. When the detection voltage of the voltage sensor 27 is equal to 6 [V] or more, it is determined that the ignition key 5 is on, and the switching element 28 is connected. As a result of connecting of the switching element 28, the trigger 151 is operated to activate the power supply circuit 15 described earlier, which supplies a 5 [V] voltage to the control device 14.

The charge lamp terminal l is provided to perform the two functions described next. The first one of the functions is the same as the ignition terminal ig, namely detecting whether the ignition key 5 is on. Accordingly, a voltage sensor 19 is connected to the charge lamp terminal l. When the detection voltage of the voltage sensor 19 is 6 [V] or more, the voltage sensor 19 determines that the ignition key 5 is on, and generates an output C. When the output C of the voltage sensor 19 is applied to the switching element 20, the switching element 20 is connected to operate the trigger 151 of the power supply circuit 15, whereby the power supply circuit 15 is activated. The other function of the charge lamp terminal l is to provide notification if there is an abnormality of the alternator assembly 1 by lighting the charge lamp 6 when there is an abnormality caused by overvoltage. Accordingly, a switching element 18 formed from an FET is connected to the charge lamp terminal l. The overvoltage warning output A from the overvoltage warning determination circuit 17 is supplied to the switching element 18, thereby connecting the switching element 18. Accordingly, the charge lamp 6 is lit to provide notification about the overvoltage abnormality.

The communication terminal c is a terminal that is used to perform digital communication with the ECU 7 that is an external device and the control device 14. A voltage sensor 29 is connected to the communication terminal c and set with a 6 [V] threshold value. The voltage sensor 29 outputs a digital signal to a communication circuit 30, and more specifically, when a signal voltage input to the communication terminal c exceeds 6 [V], the voltage sensor 29 outputs a high level signal "1", and when the signal voltage is 6 [V] or less, the voltage sensor 29 outputs a low level signal "0". The communication circuit 30 receives a signal from the ECU 7 based on the digital signal output from the voltage sensor 29. In addition, when a switching element 31 formed from an FET that is connected to the communication terminal c is connected, the potential of the control device 14 is set to a low level "0", and when the switching element 31 is not connected, the potential of the control device 14 is set to a high level "1". A digital signal generated by this change of potential, is sent from the communication circuit 30 to the ECU 7. In this manner, the control device 14 can perform two-way communication with the ECU 7.

The communication terminal g is a terminal that is used for performing concise communication with the ECU 7 that is an external unit. A voltage sensor 32 is connected to the communication terminal g. When the signal potential of the communication terminal g is 6 [V] or less, the voltage sensor 32 determines that the signal potential is a low level and outputs "0", and when the signal potential exceeds 6 [V], the voltage sensor 32 determines that the signal potential is a high level and outputs "1". The output of the voltage sensor 32 is supplied to an earth detection circuit 33 that detects that the terminal G is earthed when the low level "0" is supplied, and sends that detection result to the ECU 7.

The communication terminal fr is a terminal for notifying the on-rate of the excitation switch 21 to the ECU 7. A switching element 34 formed from an FET is operated in association with operation of the excitation switch 21, and changes the voltage of the communication terminal fr. The ECU 7 monitors the voltage of the communication terminal fr, and computes the on-rate or the off-rate of the excitation switch 21 from the change of the voltage.

The alternator assembly 1 with the above-described structure is mounted in the vehicle. The stator coil 111 is energized by the field coil 121 of the rotor 12 that is driven to rotate by the engine, and generates a three-phase alternating voltage. The alternating voltage of the stator coil 111 is rectified to direct current by the rectifier 13 and output from the power supply terminal B. The control device 14 performs the specified operations described above using the circuits and elements etc. connected to the respective terminals, and thereby controls the alternator 10.

Note that, when various types of checks are performed on the alternator assembly 1 at a plant or the like, the alternator 10 is coupled to an internal combustion engine included in the testing equipment, and the power supply terminal B is connected to a vehicle battery included in the testing equipment. Further, the power supply terminal b, the field terminal f, the phase voltage input terminal p, and the earth terminal e of the control device 14 are respectively connected as shown in FIG. 2, described earlier, to the rectifier 13 and the alternator 10 inside the alternator assembly 1. In addition, the ignition terminal ig, the charge lamp terminal l, the communication terminal c, the communication terminal g and the communication terminal fr are connected to an external power supply (not shown) via an interface (not shown).

When checking is performed with the alternator 10 in this state, first the rotor 12 of the alternator 10 is driven by the internal combustion engine such that the stator 11 generates a determined output, in the same manner as when the vehicle is running normally. In addition, a voltage of 6 [V] is applied to the ignition terminal ig, the charge lamp terminal l, the communication terminal c, the communication terminal g and the communication terminal fr from the external power supply, whereby the power supply circuit 15 is triggered such that internal power is supplied in the control device 14. Then, the necessary checks are performed, such as, for example, a check of the; full power generation of the alternator 10. Furthermore, when the operation of the overvoltage warning determination circuit 17 is checked, the output voltage of the alternator 10 is increased to 17 [V], and it is confirmed that the overvoltage warning determination circuit 17 does not generate the overvoltage warning output A in this overvoltage state.

When performing checking of the alternator assembly 1 as described above, it is sometimes necessary to perform a check of the full power generation of the alternator 10 or to perform a check when the control device 14 places the alternator 10 in a state in which full power can be obtained, namely, when the excitation switch 21 is turned fully on. In these cases, it is necessary to complete load response control before the alternator 10 can achieve full power. Accordingly, in order to complete the check it is necessary to wait at least until the load response control has been completed. Normally, if load response control is not being used, it only takes a few hundreds of a millisecond at the longest for full power to be achieved. However, if load response control is being used, it can be necessary to wait as long as a few tens of seconds for full power to be achieved. Accordingly, it is necessary to wait, at least the duration of this period until the check can be completed.

Furthermore, according to known vehicle alternator control devices, the warning of the overvoltage warning portion is generated in some systems when three conditions are satisfied, namely, when the voltage generated by the alternator is an overvoltage of a determined value or more, when the excitation switch of the field coil is turned on, and when the overvoltage of the determined value or more continues for a determined period or longer. In such systems, when checking the operation of the overvoltage warning portion at the plant, in order to satisfy all three of the conditions, first, a determined overvoltage is applied to the power supply terminal of the alternator. Then, in this state, the excitation switch of the field coil is turned on, and this operating state is continued for a determined period. However, turning on the excitation switch while the determined overvoltage is applied is problematic. Furthermore, because this state is maintained for the determined period, the check time becomes longer, thereby making checking at the plant difficult.

In addition, if the operation of the overvoltage warning determination circuit 17 of the alternator control device 14 is checked at the plant, the output voltage of the alternator 10 needs to be set to 18 [V] and an overvoltage of 18 [V] continuously applied to the voltage sensor 16 in order to perform the check. However, given this, it is necessary to continuously apply an overvoltage to the vehicle battery included in the testing equipment connected to the alternator, which may cause damage of the vehicle battery included in the testing equipment on some occasions. To address this difficulty, instead of performing the above-described check, a check may be performed in which the output voltage of the alternator 10 is set to 17 [V] and applied to the terminal b to check, at the least, that a warning is not mistakenly generated at 17 [V]. In this case, although no information is provided about whether a warning is generated at an overvoltage of 18 [V], the check can verify that a warning is not mistakenly generated at 17 [V]. However, it can also be judged that the probability obtained from multiplication of the probability that, during actual usage of a vehicle, the alternator will suffer a failure at an overvoltage of 18 [V] or more, and the probability that the overvoltage warning of the control device 14 will fail to operate, is extremely small.

Figure 4:
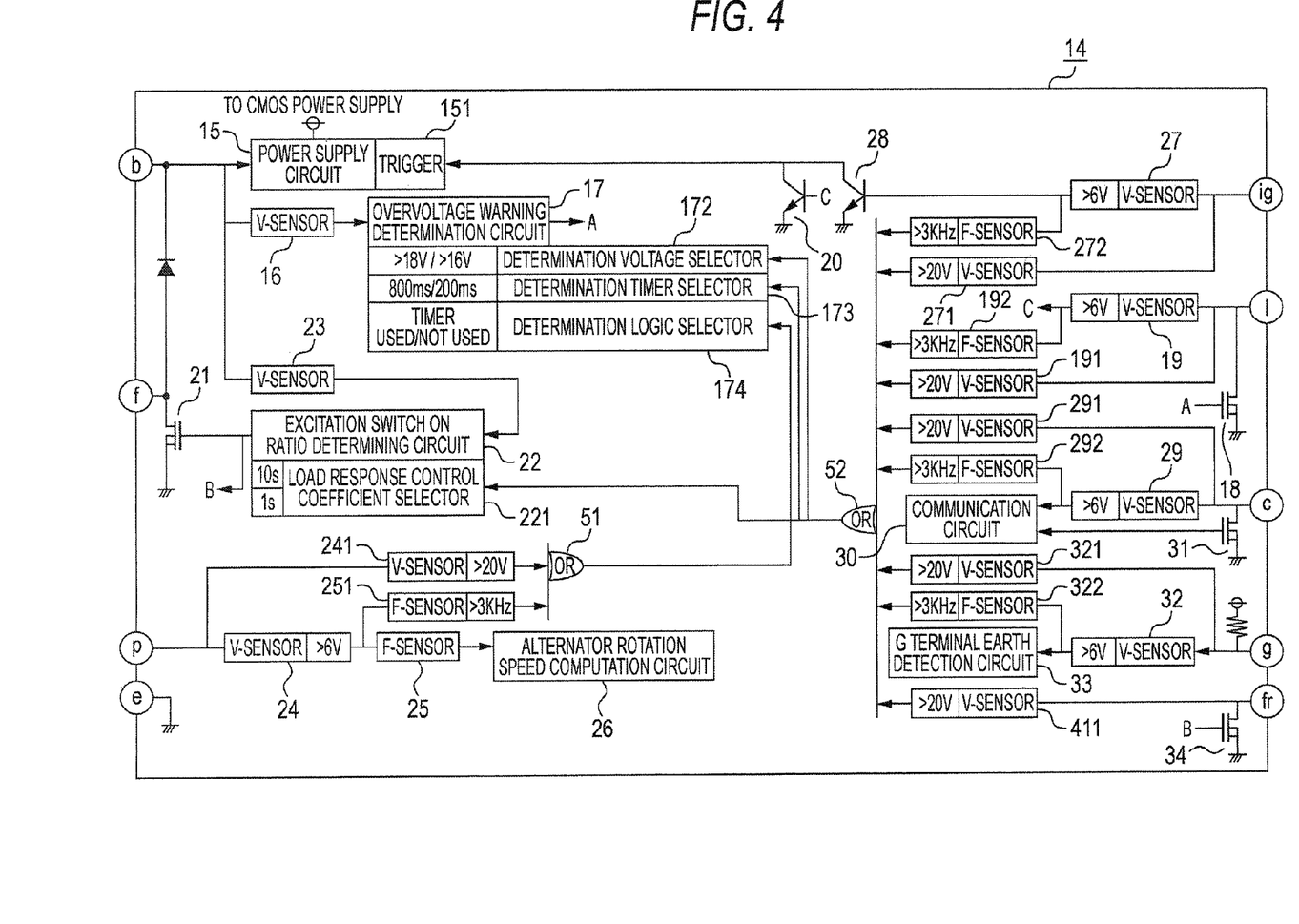
FIG. 4 is a structural diagram showing the control device 14 of the vehicle alternator according to a first embodiment of the invention.

FIG. 4 is a structure chart showing the alternator control device 14 according to the first embodiment of the invention. In FIG. 4, the power supply terminal b, the field terminal f, the phase voltage input terminal p, the earth terminal e, the ignition terminal ig, the charge lamp terminal l, the communication terminal c, the communication terminal g and the communication terminal fr are the same as each terminal of the vehicle alternator control device 14 that is the basic form of the invention described earlier and shown in FIG. 3. In the invention, the power supply terminal b configures a first external terminal, the field terminal f configures a second external terminal, and the phase voltage input terminal p configures a third external terminal. In addition, the ignition terminal ig, the charge lamp terminal l, the communication terminal c, the communication terminal fr and the communication terminal g respectively configure fourth external terminals. Among the fourth external terminals, the ignition terminal ig, the charge lamp terminal l, the communication terminal c, the communication terminal fr and the communication terminal g may be selectively provided depending on necessity.

A voltage sensor 241 is connected to the phase voltage input terminal p. When the voltage applied to the phase voltage input terminal p is 20 [V] or more, the voltage sensor 241 generates an output that is input to an OR circuit 51. A frequency sensor 251 is connected to the output side of the voltage sensor 24 connected to the phase voltage input terminal p. When the frequency of the voltage output from the voltage sensor 24 is 3 [kHz] or more, the frequency sensor 251 generates an output that is input to the OR circuit 51.

The ignition terminal ig, the charge lamp terminal l, the communication terminal c, the communication terminal g and the communication terminal fr are respectively connected to voltage sensors 271, 191, 291, 321, 411. When the respective voltages applied to the ignition terminal ig, the charge lamp terminal l, the communication terminal c, the communication terminal g and the communication terminal fr exceed 20 [V], the voltage sensors 271, 191, 291, 321, 411 respectively generate an output that is input to an OR circuit 52. In addition, frequency sensors 272, 192, 292, 322 are respectively connected to the output sides of the voltage sensors 27, 19, 29, 32 that are respectively connected to the ignition terminal ig, the charge lamp terminal l, the communication terminal c, the communication terminal g and the communication terminal fr. When the respective voltages output from the voltage sensors 27, 19, 29, 32 that respectively correspond to the frequency sensors 272, 192, 292, 322 are 3 [kHz] or more, the frequency sensors 272, 192, 292, 322 generate an output that is input to the OR circuit 52.

The voltage sensors 241, 271, 191, 291, 321, 411 and the frequency sensors 251, 272, 192, 292, 322 configure a specified signal detection portion of the invention. Moreover, the signal with a voltage of 20 [V] or more detected by the voltage sensors 241, 271, 191, 291, 321, 411 corresponds to a specified signal of the invention. Furthermore, the signal with the frequency of 3 [kHz] or more detected by the frequency sensors 251, 272, 192, 292, 322 corresponds to a specified signal of the invention. These specified signals are signals that are not applied when the alternator is operating normally.

The overvoltage warning determination circuit 17 acts as an overvoltage warning portion, and is configured to be able to operate in three modes, namely, a warning generation operating mode and two detection operating modes. In the warning generation operating mode, when the output of the voltage sensor 16, which detects the output voltage of the alternator 10 applied to the power supply terminal b, is 18 [V] or more and this output voltage continues for a period of 800 [msec], the overvoltage warning determination circuit 17 generates the overvoltage warning output A. In the first detection operating mode, when the output of the voltage sensor 16 is 16 [V] or more and this output voltage continues for 200 [msec], the overvoltage warning determination circuit 17 generates the overvoltage warning output A. In the second detection operating mode, no determination timer is set, and thus when the output of the voltage sensor 16 is 16 [V] or more, the overvoltage warning determination circuit 17 immediately generates the overvoltage warning output A.

A determination voltage selector 172 switches an operating voltage from 18 [V] to 16 [V] when an output signal from the OR circuit 52 is input. A determination timer selector 173 switches a determined time from 800 [msec] to 200 [msec] when the output signal is input from the OR circuit 52. A determination logic selector 174 selects "no timer" when the output signal is input from the OR circuit 51 such that when there is an overvoltage of 16 [V], the overvoltage warning determination circuit 17 immediately generates the overvoltage warning output A, or in other words, the continuation time of the 16 [V] overvoltage is set to substantially zero. The determination voltage selector 172, the determination timer selector 173, and the determination logic selector 174 respectively configure an overvoltage warning operation mode switching portion of the vehicle alternator control device of the invention.

A load response control coefficient selector 221 switches a control coefficient for load response control from 10 [s] to 1 [s] when the output signal is input from the OR circuit 52, and thereby switches the load response control from a normal operating mode to a detection operating mode. The load response control coefficient selector 221 configures a load response coefficient switching portion of the vehicle alternator control device according to the invention.

The other structural members of this embodiment are the same as those of the basic form of the alternator control device of the invention shown in FIG. 3. As can be seen from FIGS. 1 and 2, the rectifier 13 is assembled as an integrated unit with the alternator 10, and the alternator control device. The alternator control device of this embodiment is mounted in the vehicle and operated in the same manner as the previously described basic form of the alternator control device.

When the alternator assembly 1 mounted in the vehicle is in a normal operating state such as when the vehicle is running, the voltage applied to the phase voltage input terminal p, the ignition terminal ig, the charge lamp terminal l, the communication terminal c, the communication terminal g and the communication terminal fr of the control device 14 is 20 [V] less, and the voltage sensors 241, 271, 191, 291, 321, 411 connected to the terminals do not generate any output. In addition, when the alternator assembly 1 is in a normal operation state, the frequency of the voltage applied to the phase voltage input terminal p, the ignition terminal ig, the charge lamp terminal l, the communication terminal c and the communication terminal g of the control device 14 is 3 [kHz] or less. Thus, the frequency sensors 251, 272, 192, 292, 322 that correspond to the terminals do not generate any output. Accordingly, there is no input to the OR circuits 51, 52, and the determination logic selector 174, the determination voltage selector 172 and the determination timer selector 173 respectively select "use timer", "18 [V]", and "800 [msec]".

At normal operating times, in accordance with the normal operating mode, the overvoltage warning determination circuit 17 generates an overvoltage warning by generating the overvoltage warning output A when the output voltage of the alternator 10, which is rectified by the rectifier 13, is 18 [V] or more, and this output voltage has continued for 800 [msec].

Next, when various types of check are performed on the alternator assembly 1 at the plant or the like, the alternator 10 is coupled to the internal combustion engine included in the testing equipment, and the power supply terminal B is connected to the vehicle battery included in the testing equipment. Further, the power supply terminal b, the field terminal f, the phase voltage input terminal p, and the earth terminal e of the control device 14 are respectively connected as shown in FIG. 2, described earlier, to the rectifier 13 and the alternator 10 inside the alternator assembly 1. In addition, the ignition terminal ig, the charge lamp terminal l, the communication terminal c, the communication terminal g and the communication terminal fr are connected to the external power supply (not shown) via the interface (not shown).

When checking is performed with the alternator 10 in this state, first, the rotor 12 of the alternator 10 is driven by the internal combustion engine such that the stator 11 generates a determined output, in the same manner as when the vehicle is running normally. In addition, a voltage of 6 [V] is applied to the ignition terminal ig, the charge lamp terminal l, the communication terminal c, the communication terminal g and the communication terminal fr from the external power supply, whereby the power supply circuit 15 is triggered such that internal power is supplied in the control device 14.

Then, necessary checks may be performed, such as, for example, a check of the full power generation of the alternator 10. In this case, a voltage of 20 [V] is applied to at least one of the ignition terminal ig, the charge lamp terminal l, the communication terminal c, the communication terminal g and the communication terminal fr. For example, if the 20 [V] voltage is applied to the ignition terminal ig, the voltage sensor 271 detects this applied voltage and generates an output signal that is input to the OR circuit 52. Accordingly, the OR circuit 52 generates an output signal, and this output signal is input to the determination voltage selector 172, the determination timer selector 173, and the load response control coefficient selector 221. As a result, the overvoltage warning determination circuit 17 is switched to the detection operating mode since the determination voltage is switched from 18 [V] to 16 [V] and the determination time of the determination timer 171 is switched from 800 [msec] to 200 [msec]. In addition, because the load response control selector 221 switches the control coefficient for the load response control from 10 [sec] to 1 [sec], the overvoltage warning determination circuit 17 switches the load response control to the detection operating mode.

Note that, even in the case that a voltage that is substantially 20 [V] is applied from the external power supply to one of the other terminals, namely, the charge lamp terminal l, the communication terminal c, the communication terminal g, or the communication terminal fr, the corresponding voltage sensor 191, 291, 321 or 411 generates an output that causes the operating mode to be switched to the specialist detection mode in a similar manner to described above, whereby the previously described check can be performed.

Switching to the detection operating mode can be performed by applying a voltage that has a voltage of 6 [V] and a frequency of 3 [kHz] from the external power supply to one of the ignition terminal ig, the charge lamp terminal l, the communication terminal c, the communication terminal g, or the communication terminal fr. For example, when a voltage that has a voltage of 6 [V] and a frequency of 3 [kHz] is applied to the charge lamp terminal l, the frequency sensor 192 detects this voltage and generates an output signal, and this output signal is input to the OR circuit 52. As a result, the OR circuit 52 generates an output signal that is sent to the determination voltage selector 172, the determination timer selector 173, and the load response control coefficient selector 221 provided in the overvoltage warning determination circuit 17. Accordingly, the overvoltage warning determination circuit 17 is switched to the detection operating mode since the determination voltage is switched from 18 [V] to 16 [V] and the determination time of the determination timer 171 is switched from 800 [msec] to 200 [msec]. In addition, because the load response control selector 221 switches the control coefficient for the load response control from 10 [sec] to 1 [sec], the detection operating mode is set.

Note that, even in the case that a substantially 6 [V] voltage with a frequency of 3 [kHz] is applied from the external power supply to one of the other terminals, namely, the ignition terminal ig, the communication terminal c, and the communication terminal g, the corresponding frequency sensor 272, 292, 322 or 411 generates an output that switches the operating mode to the detection operating mode in a similar manner to described above, whereby the previously described check operation can be performed.

After the alternator assembly 1 is placed in detection operating mode, for example, checks like a check of the full power generation of the alternator 10, a check when the control device 14 places the alternator 10 in a state in which full power can be obtained, or a check of the operation of the overvoltage warning determination circuit. If a check of the overvoltage warning determination circuit 17 is performed, the output voltage of the alternator 10 is increased to 16 [V]. Since the overvoltage warning determination circuit 17 is in the detection operating mode, when it is determined that the output from the voltage sensor 16 is 16 [V] and this has continued for 200 [msec], the overvoltage warning determination circuit 17 generates the overvoltage warning A to provide notification about the overvoltage.

On the other hand, if the a 20 [V] voltage is applied to the phase voltage input terminal p from the external power supply, the voltage sensor 241 detects this voltage and generates an output signal that is input to the OR circuit 51. As a result, the OR circuit 51 generates an output signal that is input to the determination logic selector 174. Accordingly, the determination logic selector 174 switches the overvoltage warning determination circuit 17 from having a determination timer to not having a determination timer, thereby setting the detection operating mode. In this state, if the output voltage of the alternator 10 is increased to 16 [V], the voltage sensor 16 detects the voltage, whereby the overvoltage warning determination circuit 17 generates the overvoltage warning output A immediately without any delay being generated by the determination timer, namely, with the continuation time being substantially zero.

In addition, if a 6 [V] voltage with a 3 [kHz] frequency is applied to the phase voltage input terminal p from the external power supply, the frequency sensor 251 detects this voltage and generates an output signal that is input to the OR circuit 51. As a result, the OR circuit 51 generates an output signal that is input to the determination logic selector 174. Accordingly, the determination logic selector 174 switches the overvoltage warning determination circuit 17 from having a determination timer to not having a determination timer, thereby setting the detection operating mode. In this state, if the output voltage of the alternator 10 is increased to 16 [V], the voltage sensor 16 detects the voltage, whereby the overvoltage warning determination circuit 17 generates the overvoltage warning output A immediately without any delay being generated by the determination timer, namely, with the continuation time being substantially zero.

Moreover, during checking of the alternator assembly 1 at the plant, in addition to performing checks in the previously described detection operating mode, other checks may be performed. More specifically, a check may be performed to confirm that the overvoltage warning determination circuit 17 does not operate when the output voltage of the alternator 10 is increased to 17 [V] in a normal state, or a check may be performed to confirm that the overvoltage warning determination circuit 17 does not mistakenly generate a warning, at the least, at 17 [V].

Note that, in order to avoid a transient voltage of 20 [V] from being applied during checking, a time filter may be placed between the output sides of the respective voltage sensors 241, 271, 191, 291, 321, 411 and the input sides of the OR circuits 51, 52 so that a voltage of 20 [V] is gradually output. In addition, in order to avoid a transient 3 [kHz] frequency from being input during checking, a time filter may be placed between the output sides of the respective frequency sensors 251, 272, 192, 292, 322 and the input sides of the OR circuits 51, 52 so that a 3 [kHz] frequency is gradually output.

According to the alternator control device of the first embodiment of the invention described above, when checks are performed at the plant or the like, for example, a check of the full power generation of the alternator 10, or a check when the control device 14 places the alternator 10 in a state in which full power can be obtained, namely, when the excitation switch 21 is turned fully on, the detection operating mode can be set, and a smaller control coefficient for the load response control can be selected. Accordingly, the time until full power is achieved, or in other words until a fully on state is reached, can be made shorter.

In addition, when checking the operation of the overvoltage warning determination circuit 17 at the plant, the detection operating mode is set and the determination time of the determination timer is set shorter. Accordingly, the check time can be reduced.

Note that, in the alternator control device according to the first embodiment described above, the voltage sensors 271, 191, 291, 321, 411 are provided for every one of the ignition terminal ig, the charge lamp terminal l, the communication terminal c, the communication terminal g, and the communication terminal fr. However, a structure may be adopted in which a voltage sensor that generates an output when a 20 [V] voltage is detected is connected to at least one of the terminals, and the setting of the specialist detection mode takes place when a 20 [V] voltage is applied from an external power supply to the terminal provided with the voltage sensor.

Furthermore, in the alternator control device according to the first embodiment described above, the frequency sensors 272, 192, 292, 322 are provided for every one of the ignition terminal ig, the charge lamp terminal l, the communication terminal c, the communication terminal g, and the communication terminal fr. However, a structure may be adopted in which a frequency sensor that generates an output when a 6 [V] voltage with a 3 [kHz] frequency is detected is connected to at least one of the terminals, and the setting of the specialist detection mode takes place when a 6 [V] voltage with a 3 [kHz] frequency is applied from an external power supply to the terminal provided with the frequency sensor.

In addition, the operating voltage of the voltage sensors 241, 271, 191, 291, 321, 411 is not limited to 20 [V]. Other voltages with different values that are higher, lower or equal to the normal voltage applied to the alternator assembly 1 may be used, so long as the voltage is not one that has a detrimental impact on the alternator assembly, other devices or the testing equipment. Similarly, the operating frequency of the frequency sensors 251, 272, 192, 292, 322 is not limited to 3 [kHz]. Other frequencies with different values that are higher, lower or equal to the normal frequency applied to the alternator assembly 1 may be used, so long as the frequency is not one that has a detrimental impact on the alternator assembly, other devices or the testing equipment.

Moreover, the above embodiment may be configured such that the specified signals include a first value and a second value above the first value. When the voltage sensors 271, 191, 291; 321, 411 detect the specified signal with the first value, the load response control selector 221 may switch the load response coefficient to 1 [s], and when the voltage sensors 271, 191, 291, 321, 411 or the frequency sensors 272, 192, 292, 322 detect the specified signal with the second value, the load response control selector 221 may perform switching such that the load response function is deactivated. In this case, the first value included in the specified signals may be a 20 [V] voltage or a frequency of 3 [kHz], and the second value may be a 50 [V] voltage or a frequency of 5 [kHz]. However, it will be readily apparent that the invention is not limited to these values.

Various modifications and alterations of this invention will be apparent to those skilled in the art without departing from the scope and sprit of this invention, and it should be understood that this is not limited to the illustrative embodiments set forth herein.

What is claimed is:

1. A control device for a vehicle alternator, comprising:
   a first external terminal that receives a rectified output of the vehicle alternator or supply of output from a battery charged by the rectified output;
   a second external terminal connected to a field coil of the vehicle alternator;
   a third external terminal to which a phase voltage of the vehicle alternator is input;
   at least one forth external terminal that is connectable to an external device; and
   an excitation control portion that controls an exciting current that flows in the field coil, the control device for the vehicle alternator performing control using a load response function that controls the excitation control portion to control the output of the vehicle alternator, and further comprising:
   a specified signal detection portion that detects when a specified signal is applied to at least one of the first to the fourth external terminals; and
   a load response coefficient switching portion that switches a value of a load response coefficient of the load response function when the specified signal detection portion detects the specified signal.

2. The control device for the vehicle alternator according to claim 1, wherein
   the specified signal is a signal having a frequency or a voltage that is not applied to the vehicle alternator during normal running.

3. The control device for the vehicle alternator according to claim 1, wherein
   the load response coefficient switching portion switches the value of the load response coefficient to a value that is less than or equal to the value of the load response coefficient of the vehicle alternator during normal running when the specified signal detection portion detects the specified signal.

4. The control device for the vehicle alternator according to claim 1, wherein
   the load response coefficient switching portion switches the value of the load response coefficient to a value that is less than or equal to the value of the load response coefficient of the vehicle alternator during normal running when the specified signal detection portion detects that the specified signal has a first value, and deactivates the load response function when the specified signal detection portion detects that the specified signal has a second value.

5. The control device for the vehicle alternator according to claim 1, further comprising:
   an overvoltage warning portion that has an operating mode that generates an overvoltage warning output when an output voltage of the vehicle alternator becomes a determined voltage value or more and the output voltage has continued for a determined continuation time or longer; and
   an overvoltage warning operating mode switching portion that switches, when the specified signal detection portion detects the specified signal, the operating mode of the overvoltage warning portion to a detection operating mode that generates the overvoltage warning output at a voltage value that is less than the determined voltage value and when the voltage has continued for less than the determined continuation time.

6. The control device for the vehicle alternator according to claim 5, wherein
   the continuation time in the detection operating mode is substantially zero.

* * * * *